US005453748A

United States Patent [19]
Lindell

[11] Patent Number: 5,453,748
[45] Date of Patent: Sep. 26, 1995

[54] METHOD AND APPARATUS FOR RESPONDING TO AN INTERROGATION SIGNAL

[75] Inventor: Kevin W. Lindell, Trumbull, Conn.

[73] Assignee: Westinghouse Norden Systems, Norwalk, Conn.

[21] Appl. No.: 152,800

[22] Filed: Nov. 15, 1993

[51] Int. Cl.$^6$ ................................................. G01S 13/79
[52] U.S. Cl. ........................ 342/51; 342/45; 342/103; 342/31
[58] Field of Search ......................... 342/51, 43, 103, 342/45, 30, 31, 32

[56] References Cited

U.S. PATENT DOCUMENTS

| 3,369,194 | 2/1968 | Anderson | 331/113 A |
| 3,701,150 | 10/1972 | Dame | 342/42 |
| 4,068,232 | 1/1978 | Meyers et al. | 342/44 |
| 4,114,151 | 9/1978 | Denne et al. | 342/44 |
| 4,274,067 | 6/1981 | Uzunoglu | 331/172 |
| 4,278,977 | 7/1981 | Nossen | 342/42 |
| 4,355,404 | 10/1982 | Uzunoglu | 375/86 |

(List continued on next page.)

OTHER PUBLICATIONS

"The Synchronous Oscillator: A Synchronization and Tracking Network", V. Uzunoglu et al, *IEEE Journal of Solid–State Circuits*, vol. SC–20, No. 6, Dec. 1985, pp. 1214–1226.

"A Practical Direct–Sequence Spread–Spectrum UHF Link", A. Kesteloot, *OST*, May 1989, pp. 14–18.

"Phase–Locked Synchronous Oscillators as Carrier Recovery Networks", V. Uzunoglu, *Satellite Communication*, Ottawa, Canada Jun. 14–17, 1983, pp. 16.8.1–16.8.5.

"Analytical and Experimental Investigations on Several Resonant Modes in Open Dielectric Resonators", M. Tsuji et al, *IEEE Transactions on Microwave Theory and Techniques*, vol. MTT–32, No. 6, Jun. 1984, pp. 628–633.

"Range Extension of a Phase–Locked Loop", B. Biswas et al, *IEEE Transactions on Communications*, Apr. 1973, pp. 293–296.

"Phase–Locked Loop Pull–In Frequency", L. Greenstein, *IEEE Transactions on Communications*, vol. COM–22, No. 8, Aug. 1974, pp. 1005–1013.

"Harmonic Entrainment of van der Pol Oscillations: Phase-locking and Asynchronous quenching", E. Dewan, *IEEE Transactions on Automatic Control*, vol. AC–17, No. 5, Oct. 1972.

"Phase–Locked Loops with Signal Injection for Increased Pull–In Range and Reduced Output Phase Jitter", P. Runge, *IEEE Transactions on Communications*, vol. COM–24, No. 6, Jun. 1976, pp. 636–644.

"Injection Locking of Microwave Solid–State Oscillators", K. Kurokawa, *Proceedings of the IEEE*, vol. 61, No. 10, Oct. 1973, pp. 1386–1410.

"On the Design of a Voltage–Tuned Push–Push Dielectric Resonator Oscillator", C. Liu et al., *Microwave Journal*, Jun. 1990, pp. 165–174.

"Resonant Frequency of Cylindrical Dielectric Resonator Placed in an MIC Environment", R. Mongia, *IEEE Transactions on Microwave Theory and Techniques*, vol. 38, No. 6, Jun. 1990, pp. 802–804.

Joseph C. Anselmo, Washington/Aviation Week Group, "'Smart Highway' Business Attracts Aerospace Firms", Aviation Week & Space Technology/Jan. 31, 1994 pp. 56–57.

*Primary Examiner*—John B. Sotomayor
*Attorney, Agent, or Firm*—Christopher O. Edwards

[57] ABSTRACT

A transponder receives a stable reference frequency transmitted from an interrogator and compares the stable reference frequency to a local oscillator frequency that has short term stability. A comparison signal is provided to a synchronous oscillator for providing a locked signal that briefly locks onto the comparison signal and "remembers" its phase and frequency characteristics. The locked signal, which is inherently locked to the stable reference signal of the interrogator, is then combined with the short-term stable local oscillator frequency, and the combined signal is used in the up-converted reply back to the interrogator.

6 Claims, 3 Drawing Sheets

U.S. PATENT DOCUMENTS

| | | | |
|---|---|---|---|
| 4,356,456 | 10/1982 | Uzunoglu | 307/48 |
| 4,370,653 | 1/1983 | Crowley | 342/42 |
| 4,532,516 | 7/1985 | Frampton et al. | 342/47 |
| 4,739,328 | 4/1988 | Koelle et al. | 342/44 |
| 4,740,792 | 4/1988 | Sagey et al. | 342/457 |
| 5,014,061 | 5/1991 | Ghose | 342/45 |
| 5,302,954 | 4/1994 | Brooks et al. | 342/44 |
| 5,349,355 | 9/1994 | Longas et al. | 342/42 |
| 5,349,356 | 9/1994 | Camiade et al. | 342/50 |
| 5,351,052 | 9/1994 | D'Hont et al. | 342/42 |
| 5,379,043 | 1/1995 | Bishop | 342/45 |
| 5,396,251 | 3/1995 | Schuermann | 342/51 |

METHOD AND APPARATUS FOR RESPONDING TO AN INTERROGATION SIGNAL

TECHNICAL FIELD

The present invention relates to interrogation methods and apparatus and, more particularly, for spread-spectrum communication.

BACKGROUND OF THE INVENTION

Present day radio frequency (RF) transponders use different modulations methods to convey information. The choice of these methods is usually a tradeoff between complexity, performance, reliability and cost.

For example, the utilization of coherent PSK within a communication link minimizes the transmitter peak power, but requires a high degree of frequency stability between the transmitter and receiver. In order to meet the frequency stability requirements, either a precision frequency source must be used at each end or a frequency tracking technique must be employed. If a burst mode communication system utilizing low-cost transmitters is required, neither of these two options are attractive. The use of precision frequency control devices is expensive and complex. The use of frequency tracking increases complexity and requires a portion of the timeline to be dedicated.

DISCLOSURE OF INVENTION

An object of the present invention is to provide a system configuration which provides frequency stability without the use of precision frequency sources, using a rapid carrier acquisition technique.

Another object of the present invention is to provide such a technique that permits the system to be built at low cost.

Still another object of the present invention is to provide such a system with minimal impact on the communication timeline.

According to the present invention, a reference frequency is transmitted from an interrogator and received at a receiver, where the reference frequency is compared to a local oscillator frequency for providing a comparison signal indicative of the reference frequency; the receiver then short-term locks onto that comparison signal for providing a locked signal also indicative of the reference frequency and, after locking, the local oscillator frequency is combined with the locked signal for providing a combined signal back to the interrogator that is locked to the reference frequency.

Such a method can be carried out in the transponder having a local oscillator for providing a local oscillator frequency signal, a comparator responsive to the reference frequency signal from the interrogator and the local oscillator frequency signal for providing a comparison signal, a synchronous oscillator, responsive to the comparison signal for providing a locked signal and a combiner, responsive to the locked signal and the local oscillator frequency signal, for providing a combined signal to the interrogator. Such a transponder is configured in such a way that its transmitter frequency and phase become stabilized to the interrogator's reference source frequency and phase. This is accomplished by using a phase-locking oscillator in the transponder that is injected with a down-converted frequency sample from the interrogator. This phase-lock oscillator has some unique features. One feature is a fast acquisition time, or the time required to become phase-stable to a reference source. For an RF transponder, this time can be on the order of hundreds of nanoseconds. Another feature is that the oscillator has a "phase memory" which allows phase stability with a small amount of phase jitter for several hundred microseconds after the reference signal is removed.

After the oscillator is locked to the reference, the transponder is then modulated with information, up-converted and transmitted. The transmitted output is derived by combining the phase-lock oscillator output with the local oscillator frequency in the transponder.

The transponder up and down converter is assumed to have a local oscillator frequency source that is phase stable long enough to transmit back the modulated waveform over the time duration from the interrogation to the reply. Therefore, the up/down frequency reference acts as a coarse frequency control, and where the phase-lock oscillator is like a fine-tune control.

This allows the transponder to reply successfully with waveforms that require certain degrees of frequency and/or phase stability which would be dependent only on the transponder local oscillator frequency source short-term stability.

The interrogator's transmitted reference carrier may be pulsed or continuous, since the transponder will stabilize rapidly to the interrogator reference and can remember its rate of change of phase for a relatively long period of time. During this time of stability, a reply waveform may be transmitted.

Thus, an RF transponder is provided which features crystal oscillator-type transmit stability using simple components that are configured to have the unique feature of being locked to an external reference signal. This keeps the performance of the transponder maximized, while minimizing cost and complexity. This is desirable, since there may be many transponders which may be provided inexpensively. It may also be possible, though not required, to provide an interrogator containing a precision frequency reference at higher cost, since only one is needed.

The present invention eliminates the need for highly accurate and stable frequency sources in transponder applications. It provides a fast acquisition time and stabilizes faster than standard phase-lock loop methods. It can be used with pulsed or continuous interrogation sources and is compatible with spread-spectrum waveforms. It is a wireless design which will work in low signal-to-noise environments. It utilizes simple components in the transponder and thereby minimizes parts count and enhances the ability to produce such a transponder at low cost. It also is able to provide high performance using a simple design and such low-cost parts.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
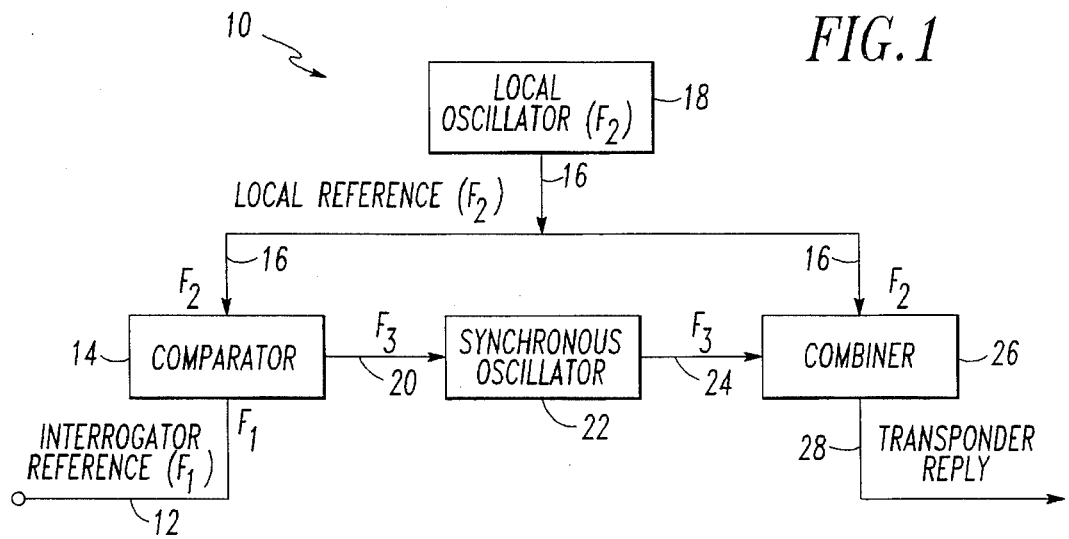
FIG. 1 shows a transponder, according to the present invention.

FIG. 1 shows a transponder 10, according to the present invention. An interrogation reference signal on a line 12 is transmitted by an interrogator (not shown in FIG. 1) that uses a reference, such as a high-quality (both long- and short-term stable) crystal oscillator. It should be understood, however, that the reference need not necessarily be high-quality. A short-term stable reference could be selected and one or more interrogated devices locked thereto in the same way as that described below. According to one embodiment of the invention, it may be a high-stability (both long- and short-term) RF reference. The interrogation reference signal on the line 12 is received by the transponder 10, and its frequency is compared in a comparator 14 to the frequency of the local oscillator frequency signal on a line 16 from a local oscillator 18. The interrogator reference signal on the line 12 is designated as having a frequency $F_1$, while the local oscillator 18 is designated as providing the local oscillator frequency signal on the line 16 at frequency $F_2$. The comparator 14 provides a comparison signal on a line 20, designated as having a frequency $F_3$, which may be, for example, a difference frequency representing the difference between the frequency $F_1$ and the frequency $F_2$. In other words, $F_3=F_1 - F_2$. Otherwise stated, $F_1=F_2+F_3$.

The comparison signal on the line 20 is provided to a synchronous oscillator 22, which is of the type described in the article "The Synchronous Oscillator: A Synchronization and Tracking Network", by Vasil Uzunoglu et al, *IEEE Journal of Solid-State Circuits*, Vol. SC-20, No. 6, December 1985, pp. 1214–1226, and in various other references, for example, cited therein. The synchronous oscillator is a free-running oscillator which oscillates at its natural frequency in the absence of an externally-applied signal. However, in the presence of such a signal, the oscillator synchronizes with and tracks the input waveform. It has a very fast acquisition time on the order of hundreds of nanoseconds and has a "phase memory" that allows phase stability with a small amount of phase jitter for several hundred microseconds after the reference signal is removed. Once the synchronous oscillator locks onto the comparison signal and provides a locked signal on a line 24, a combiner 26 is utilized to combine the local oscillator frequency signal ($F_2$) on the line 16 with the frequency ($F_3$) of the locked signal on the line 24, thereby providing a combined signal on a line 28 which is used as a transponder reply signal. If the comparator 14 provides a comparison signal on the line 20 that represents the difference in frequencies between the local oscillator frequency signal on the line 16 and the interrogator reference signal on the line 12, then the combiner may provide, on the other hand, the combined signal on the line 28 having a frequency representative of the sum of the local oscillator frequency ($F_2$) signal and the locked signal frequency ($F_3$). In other words, the frequency of the signal on the line 28 then corresponds to the frequency of the interrogator reference signal on the line 12 ($F_2+F_3=F_1$).

The local oscillator frequency needs only to have the stability requirements that (1) it be stable enough between the timing of the receipt of the interrogator reference signal on the line 12 and the transponder reply signal on the line 28 for the coding scheme used (i.e., short-term stability) and (2) it be stable enough over extended periods and environmental influences so that the synchronous oscillator used in the system can still perform properly (i.e., long-term stability).

Figure 2:
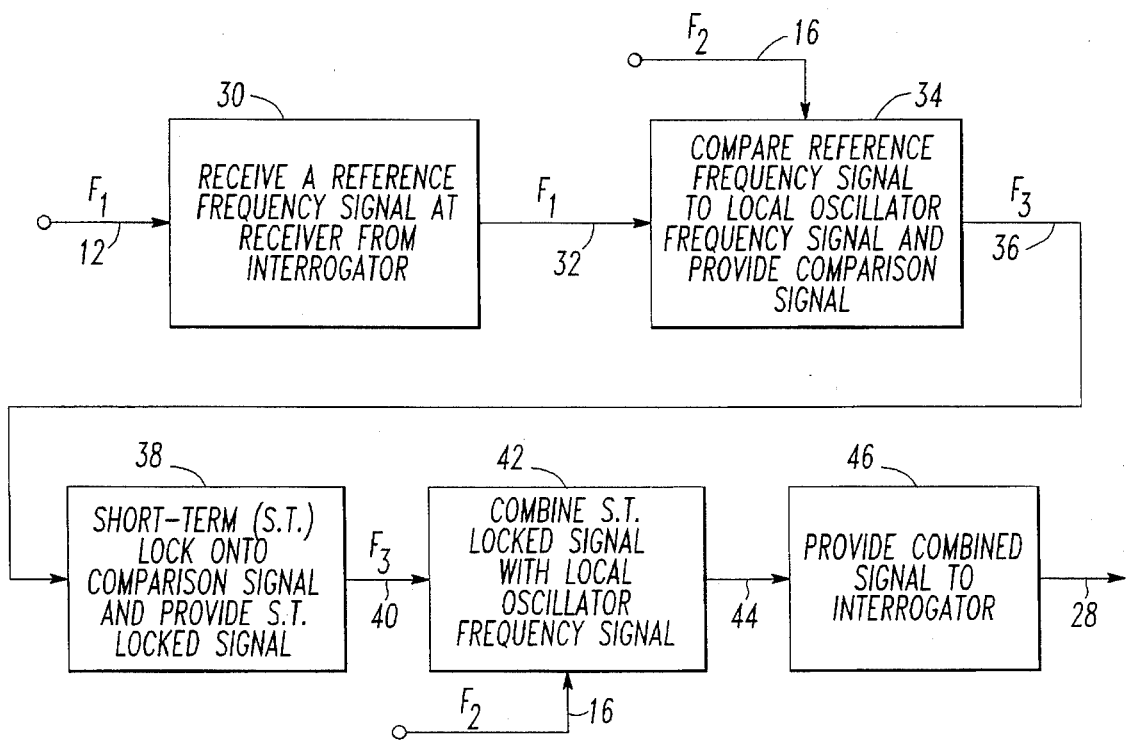
FIG. 2 shows a method for responding to an interrogation signal, according to the present invention.

FIG. 2 shows a method, according to the present invention, for responding to an interrogator reference signal such as the signal on the line 12 of FIG. 1. After such a reference frequency signal is received, as shown in a step 30, the received signal (or a converted version thereof) is provided, as indicated by a line 32, in order that a comparison step 34 may be carried out. A local reference signal such as the local reference signal 16 of FIG. 1 is compared in the step 34 to the received signal provided on the line 32; and a comparison signal is provided, as indicated by a line 36 for the purpose of being "locked" over a short-term (S.T.). In other words, in response to the comparison of the local oscillator signal and the received reference frequency signal, a comparison therebetween is stabilized for a short period of time in the comparison step 38; and a signal manifestation thereof is provided, as shown by a signal line 40 for that brief period of short-term locking. During that period, a step 42 is carried out in which the local oscillator frequency signal on the line 16 is combined with the locked signal on the line 40 for providing a combined signal on a line 44 which is provided, as indicated in a step 46, to the interrogator that provided the signal on the line 12.

The method of FIG. 2 is carried out in any number of transponders responding to the interrogator operating, for example, in burst mode. The interrogator interrogates a plurality of transponders with the interrogation signal over a plurality of successive interrogation and reply periods. The interrogator oscillator has a reference frequency that is stable within selected limits over a term greater than the plurality of successive interrogation and reply periods. The local oscillators have to be frequency stable within the selected limits over a term greater than at least one of the interrogation and reply periods for providing its respective comparison signal that has sufficiently stable frequency and phase characteristics for at least the one of the interrogation and reply periods.

Figure 3:
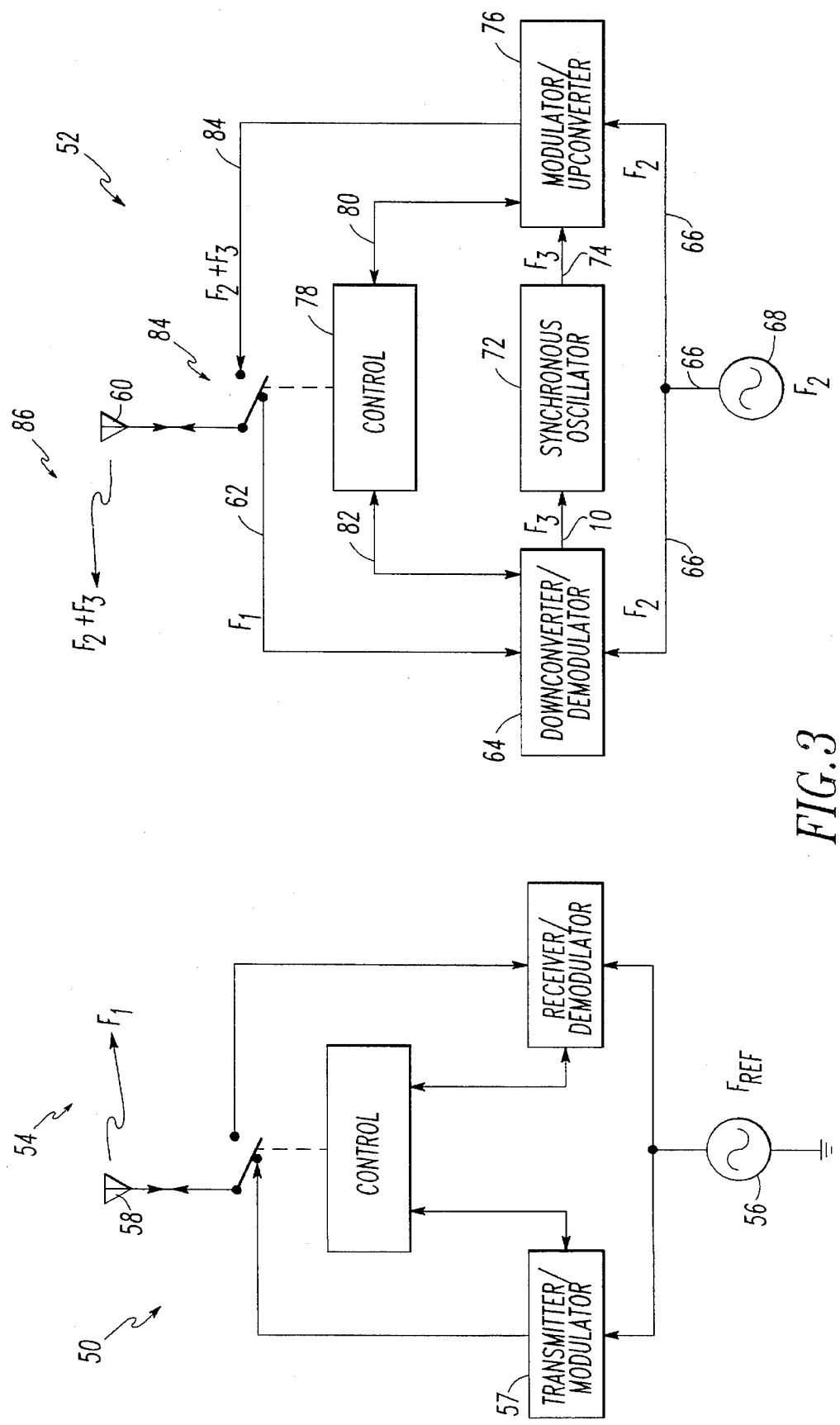
FIG. 3 shows an interrogator, according to the present invention, sending an interrogation signal to an transponder, also according to the present invention, which is shown sending a response signal back to the interrogator.

Referring now to FIG. 3, a simple embodiment of the present invention is shown comprising an interrogator 50 at an interrogation location, such as a control tower at an airport. Such has uses with a ground traffic control radar system, as described, for example, in copending U.S. patent application Ser. No. 08/068,478, since issued as U.S. Pat. No. 5,334,982. A transponder 52 located at a transponder location, such as on an aircraft or other airport vehicle, may be coded with identification information unique to the particular vehicle. The interrogator 50 transmits an RF interrogation signal 54 that is created with the use, e.g., of a high-stability RF reference 56 which may be a crystal oscillator, oven-controlled or the like. Such a stable reference is, of course, quite expensive, but can be justified based on its use at only a single location, according to the present invention. It should be realized, however, that the interrogator need not be provided with such a high-quality oscillator, it only being necessary to provide such with sufficient short-term stability, within selected limits, that is longer than a selected number of successive interrogation and reply periods. A transmitter/modulator 57 provides an interrogation signal on a line 57a to an antenna 58 that provides the RF interrogation signal 54. The interrogation signal 54 is received by the transponder 52 which locks its transmission frequency to the interrogator frequency reference. Once the two frequency references are locked together, which is described in more detail below, the coded information may be transmitted from the transponder back to the interrogator. The locking of the two references may be necessary to keep within selected frequency constraints of a given system.

The interrogation signal 54 may be transmitted at a frequency $F_1$, as indicated, which is referenced to the precision internal frequency reference 56 or frequencies synchronized thereto. In any event, the antenna 58 transmits the interrogation signal 54, and a transponder antenna 60 receives the interrogation signal and provides it on a line 62 to a down-converter and demodulator 64, where it is down-converted to an intermediate frequency by a local oscillator frequency signal on a line 66 that may be provided by an inexpensive local oscillator 68. The local oscillator 68 constitutes the local frequency reference, for example, at frequency $F_2$ and, as mentioned above, needs to have the following stability requirements:

1. that it be stable enough between the interrogate and reply times for the coding scheme used (i.e., short-term stability);
2. that it be stable enough over extended periods and environmental influences so that the locking oscillator used in the system can still perform properly (i.e., long-term stability).

The frequency reference $F_2$ on the line 66 may be subtracted from the frequency $F_1$ on the line 62 by the down converter 64 using well-known techniques, such as a mixer, filters and the like. This creates a difference frequency $F_3$ on a line 70 which is provided to a synchronous oscillator 72 that locks precisely to its phase characteristics within a finite period of time. The frequency signal $F_3$ on the line 70 may then be removed, and the locked oscillator nonetheless "remembers" the phase characteristics of the frequency $F_3$ signal on the line 70 for a period of time necessary to retransmit information back to the interrogator. It should be realized, however, that the circuit 52 would still work if the interrogator sent out continuous wave interrogation signals.

To retransmit the information, the locking, synchronous oscillator 72 provides a replica signal on a line 74 of the frequency signal $F_3$ on the line 70, that is modulated in a modulator/up-converter with information provided, for example, by a control 78 on a line 80, and then up-converted by the local oscillator frequency signal $F_2$ on the line 66 from the local oscillator 68.

Therefore, frequency $F_2+F_3=F_1$ for the duration of time necessary to reply to the interrogator with transponder information. In other words, the embodiment disclosed in FIG. 3 shows the interrogator 50 and the transponder 52 transmitting to each other at the same RF frequency.

The control 78 is responsive to the presence of the incoming interrogation signal on the line 62 by means of, for example, the down-converter/demodulator 64 providing a signal indication thereof on the line 82. The control then provides the necessary control signal to modulate the return signal and to change the position of a switch 84 to permit the antenna 60 to be used to radiate the up-converted signal on the line 84 as a reply signal 86 back to the interrogator. Of course, it will be realized that there could be separate receive and transmit antennas and, in that case, there would be no need for a switch 84. Still other embodiments might use different interrogate and response frequencies and separate them using a duplexer attached to a common antenna.

Figure 4:
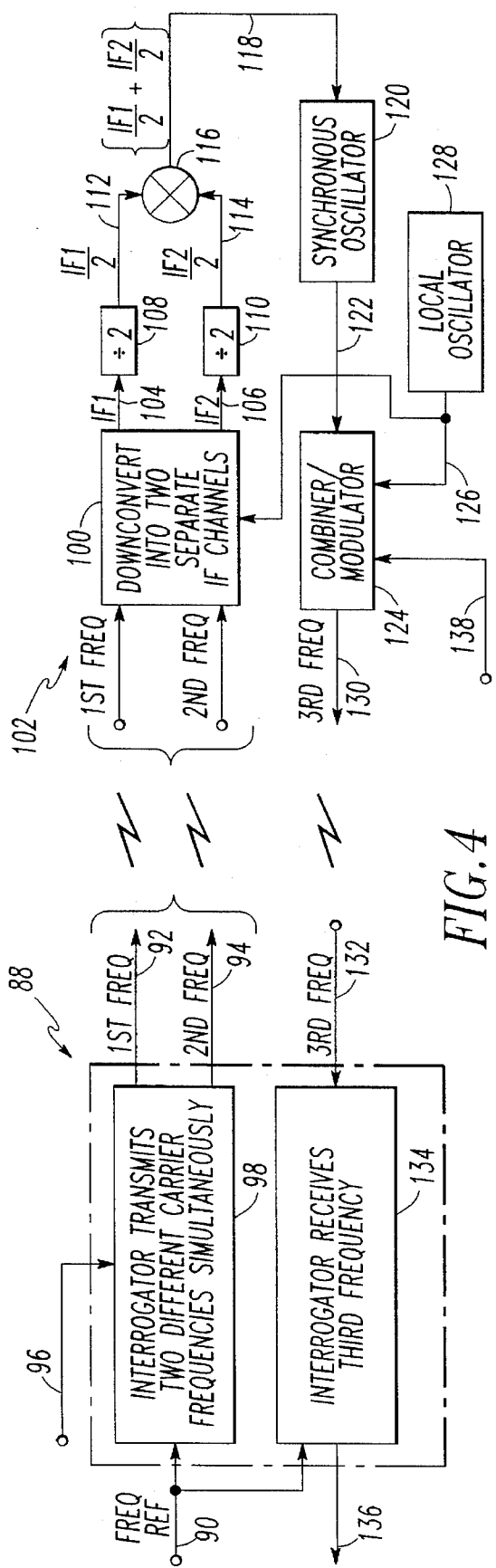
FIG. 4 shows an interrogator that sends two different frequencies simultaneously to a transponder, according to the present invention.
Figure 5:
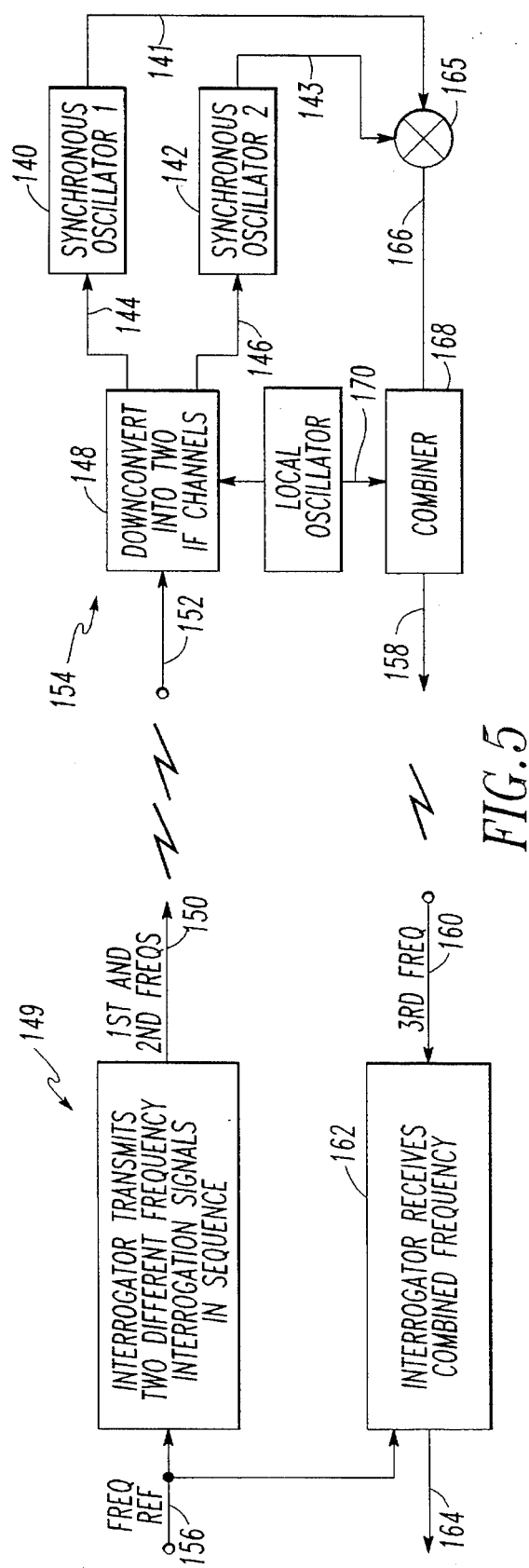
FIG. 5 shows an interrogator that transmits two different reference frequency interrogation signals in sequence to a transponder, according to the present invention.

Such different embodiments are shown, for example, in FIGS. 4 and 5. FIG. 4 shows an interrogator 88 that has a stable frequency reference signal on a line 90 from a stable reference source and which transmits first and second reference frequency signals on the lines 92, 94, which are at different frequencies, simultaneously. It is assumed that the reference frequencies used for the first and second frequency signals on lines 92, 94 will both be derived from the stable frequency reference signal on the line 90. Intelligence provided on a signal line 96 may be modulated onto the references, as before. If the different reference frequencies are transmitted simultaneously, as indicated in a transmission block 98, they are:

1. down-converted in a down-converter block 100 in a transponder 102 into separate intermediate frequency channels (IF1, IF2) on signal lines 104, 106.
2. Each IF channel is divided in frequency by two in division blocks 108, 110 which in turn provide divided intermediate frequency signals on lines 112, 114.
3. The divided outputs on the lines 112, 114 from the IF channels are then mixed in a mixer 116 to provide a new IF frequency signal on a line 118. This new IF frequency may be obtained from the sum of the divided outputs on the lines 112, 114.
4. The new IF frequency of the signal on the line 118 is provided to a synchronous oscillator 120 that will lock thereto and provide an output signal on a line 122 that is at the same frequency as the signal on the line 118 and that will be sustained briefly even though the signal on the line 118 may very quickly disappear. In other words, the synchronous oscillator locks on the signal on the line 118 and provides the output signal on the line 122 that "remembers" the phase and frequency characteristics of the signal on the line 118, even though the signal on the line 118 disappears. It provides the signal on the line 122 to a combiner 124 which combines the signal on the line 122 with a local oscillator frequency signal on a line 126 from a simple and inexpensive local oscillator 128. The combiner receives the signal on the line 122 for a long enough period to retransmit a reply on a line 130 to the transponder 88 at a third frequency.
5. In other words, the new IF frequency on the line 118 is combined with the local oscillator 128, creating a transmit reply frequency on the line 130 different from the interrogation frequencies.

The interrogator 88 receives the third frequency on the line 132 and processes the signal in a block 134 which may include a demodulator to recover intelligence that may have been modulated onto the signal on the line 130 before leaving the transponder. This, of course, is not the subject of the present invention per se, but would have been accomplished, for example, in a modulation block (not shown) within the combiner 124 in response to an intelligence signal on a line 138.

If the two interrogation frequencies cannot be simultaneously transmitted, it will be necessary, as shown in FIG. 5, to use separate phase-lock oscillators 140, 142 that will be injected with different IF channel signals on separate IF channel signal lines 144, 146. These are in turn provided by a down-converter 148 that is responsive to two interrogation signals at two different frequencies sent from an interrogator 149 on a line 150 and received on a line 152 in a transponder 154. As before, the interrogator 149 will be responsive to a stable frequency reference signal on a line 156 and will be responsive to a reply signal provided by a signal line 158 by the transponder 154 and received on a line 160 in the interrogator 149 for being received and demodulated in a block 162 for providing an intelligence signal on a line 164.

The two down-converted IF channels on the lines 144, 146 are used by the separate locked oscillators 140, 142 to create a new IF frequency signal on a line 166 that may be mixed in a combiner 168 with a local oscillator signal on a line 170 to provide the RF transmit frequency on the line 158, which is different from the interrogate frequencies on the line 150. In this method, because of the lack of simultaneity, it is necessary that the two locked oscillators 140, 142 "remember" for a longer period of time than the system of FIG. 3, which replies at the same RF frequency.

This method of replying at a different frequency, as shown in FIGS. 4 and 5, can be configured with N different interrogation frequencies, creating N down-converted IF channels, allowing different combinations of reply frequencies to be created. It is important to note that the N IF channels must be frequency divided by the integer value N. This is required so that the new IF channel that is derived by frequency mixing the various IF channels' locked sources has a complementary frequency offset error, which was caused by the local oscillator in the transponder. Therefore, when a reply is transmitted, the frequency error caused by the local oscillator is cancelled out, if the short-term stability of the local oscillator is good enough for the chosen system application.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A transponder, comprising:

a local oscillator for providing a local oscillator frequency signal;

a comparator, responsive to a reference frequency signal from an interrogator and to the local oscillator frequency signal, for providing a comparison signal;

a synchronous oscillator, responsive to the comparison signal, for providing a locked signal; and a combiner, responsive to the locked signal and the local oscillator frequency signal, for providing a combined signal to the interrogator.

2. A transponder comprising:

a local oscillator for providing a local oscillator frequency signal;

a comparator, responsive to a reference frequency signal from an interrogator and to the local oscillator frequency signal, for providing a comparison signal;

a synchronous oscillator, responsive to the comparison signal, for providing a locked signal; and a combiner, responsive to the locked signal and the local oscillator frequency signal, for providing a combined signal to the interrogator, wherein the reference frequency signal from the interrogator and the combined signal to the interrogator are both at a same first frequency, wherein the local oscillator frequency signal is at a second frequency, wherein the comparator provides the compared signal at a third frequency equal to a difference between the first and second frequencies, wherein the locked signal is at the third frequency, and wherein the combined signal is at a frequency equal to a sum of the second and third frequencies which sum frequencies equal the first frequency.

3. A transponder, comprising:

a local oscillator for providing a local oscillator frequency signal;

a comparator, responsive to a reference frequency signal from an interrogator and to the local oscillator frequency signal, for providing a comparison signal;

a synchronous oscillator, responsive to the comparison signal, for providing a locked signal; and a combiner, responsive to the locked signal and the local oscillator frequency signal, for providing a combined signal to the interrogator, wherein the reference frequency signal from the interrogator is two reference frequency signals at different first and second frequencies provided simultaneously, wherein the comparator is responsive to the two reference frequency signals for providing first and second comparison signals and wherein the transponder further comprises:

first and second dividers, respectively responsive to the first and second comparison signals, for providing first and second divided signals; and a mixer, responsive to the first and second divided signals, for providing a summed signal as the comparison signal provided to the synchronous oscillator, wherein the combined signal to the interrogator is at a third frequency different from the first and second frequencies.

4. A transponder, comprising:

a local oscillator for providing a local oscillator frequency signal;

a comparator, responsive to a reference frequency signal from an interrogator and to the local oscillator frequency signal, for providing a comparison signal;

a synchronous oscillator, responsive to the comparison signal, for providing a locked signal; and a combiner, responsive to the locked signal and the local oscillator frequency signal, for providing a combined signal to the interrogator, wherein the reference frequency signal from the interrogator is two reference frequency signals provided sequentially at different frequencies, wherein the comparator is responsive to the two reference frequency signals for providing two corresponding intermediate frequency signals, wherein the synchronous oscillator is responsive to one of the intermediate frequency signals for providing a first locked signal and wherein the transponder further comprises:

a second synchronous oscillator, responsive to a second one of the intermediate frequency signals, for providing a second locked signal;

a mixer, responsive to the first and second locked signals, for providing a mixed signal to the combiner; and wherein the combined signal is a third frequency different from the frequencies of the two reference signals.

5. A method, comprising the steps of:

receiving a reference frequency signal transmitted from an interrogator during an interrogation period;

comparing the reference frequency signal to a local oscillator frequency signal for providing a comparison signal during the interrogation period wherein the comparison signal has phase and frequency characteristics of the reference frequency signal;

providing during a reply period after the interrogation period, in response to the comparison signal, a locked signal also having the phase and frequency characteristics of the reference frequency signal; and combining the local oscillator frequency signal with the locked signal for providing a combined signal to the interrogator during the reply period.

6. A method, comprising the steps of:

interrogating, from an interrogator, a plurality of transponders with an interrogation signal over a plurality of successive interrogation and reply periods, wherein the interrogation signal is derived from an interrogator oscillator having a reference frequency stable within selected limits over a term greater than the plurality of successive interrogation and reply periods, and wherein the method, at each of a plurality of receivers, further comprises the steps of:

comparing a signal indicative of the interrogator reference frequency to a signal indicative of a local oscillator frequency that is stable within the selected limits over a term greater than at least one of the interrogation and reply periods for providing a comparison signal having frequency and phase characteristics derived from both the interrogator and local reference frequency signals;

providing, in response to the comparison signal, a locked signal that retains the frequency and phase characteristics of the comparison signal for at least one of the interrogation and reply periods;

combining the locked signal and the local reference frequency signal for providing a combined signal; and providing the combined signal to the interrogator.

* * * * *